INFORMATION RECORDING APPARATUS

Filed Dec. 24, 1956 2 Sheets-Sheet 1

INVENTOR
EDWARD ROGAL

INVENTOR

EDWARD ROGAL

United States Patent Office 3,080,551

Patented Mar. 5, 1963

3,080,551
INFORMATION RECORDING APPARATUS

Edward Rogal, North Scituate, Mass., assignor to Universal Controls, Inc., New York, N.Y., a corporation of Maryland Filed Dec. 24, 1956, Ser. No. 630,393
10 Claims. (Cl. 340—174.1)

The present invention relates to the recording of information and more particularly to the recording of a large number of readily accessible discrete units of information.

The object of the present invention is to provide apparatus of the foregoing type comprising a novel association of remote controlled disks and heads, the disks being rotatable to predetermined angular positions and the heads being carried by arms that are constrained for predetermined motion with respect to the disks.

Other objects of the present invention will in part be obvious and will in part appear hereinafter.

The invention accordingly comprises the apparatus possessing the features, properties and relation of components which are exemplified in the following detailed disclosure, and the scope of which will be indicated in the appended claims.

For a fuller understanding of the motive and objects of the invention, reference should be had to the following detailed description taken in connection with the accompanying drawings wherein.

Figure 1:
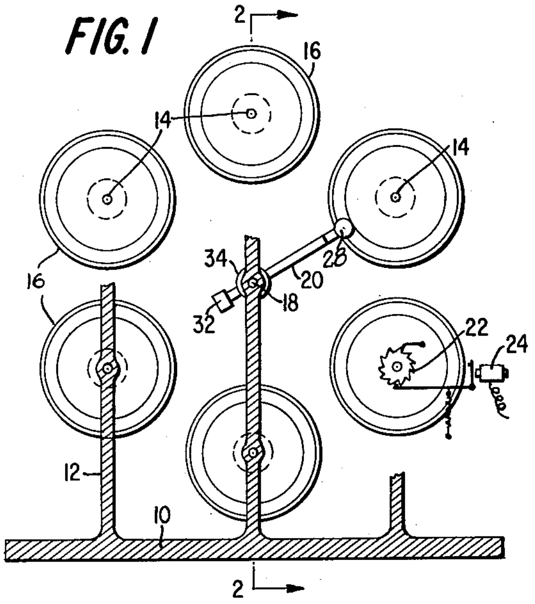
FIGURE 1 is a broken away end elevation of one embodiment of the present invention.
Figure 2:
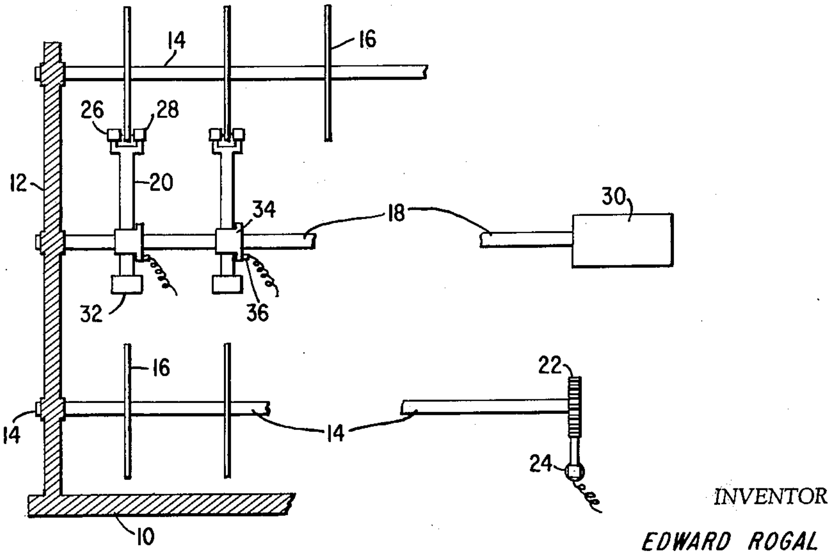
FIGURE 2 is a sectional view of the embodiment of FIGURE 1 taken along the line 2—2.

Generally, the embodiment of FIGURES 1 and 2 comprises a plurality of disks at least one face of each of which is surfaced with a magnetic material. Associated with these disks are arms bearing at their outer ends heads for recording, reading and erasing information on the magnetic material. The rotational positions of the disks and the arms are remotely controlled.

As illustrated, this embodiment comprises a base 10 on which are mounted a plurality of upstanding supports 12. Journaled on supports 12 are six shafts 14, to each of which are keyed six disks 16, and a shaft 18, to which are keyed six arms 20. Both faces of each disk are surfaced with a magnetic recording medium. A ratchet 22 and a solenoid controlled stepping pawl 24 (only one of each shown) rotate each shaft 14 to remotely controlled predetermined positions. At the outer end of each arm 20 is carried a pair of magnetic heads 26 and 28 disposed to sweep both faces of their associated disks. A constant speed motor 30 drives shaft 18 and, in consequence, heads 26 and 28 at a velocity dictated by fidelity requirements of recording and reading. Each arm is counter balanced by a weight 32 and is associated with a slip ring 34 and brush 36 that transmit signals to and from heads 26 and 28.

It will be noted that each pair of heads 26 and 28 in operation sweep in a circular path across all six of their associated disks. Acess to a particular unit of information at a particular location on one of the disks is achieved by automatic controls (not shown) that select one of arms 20, one of heads 26 and 28, one rotational position of one of disks 16.

Figure 3:
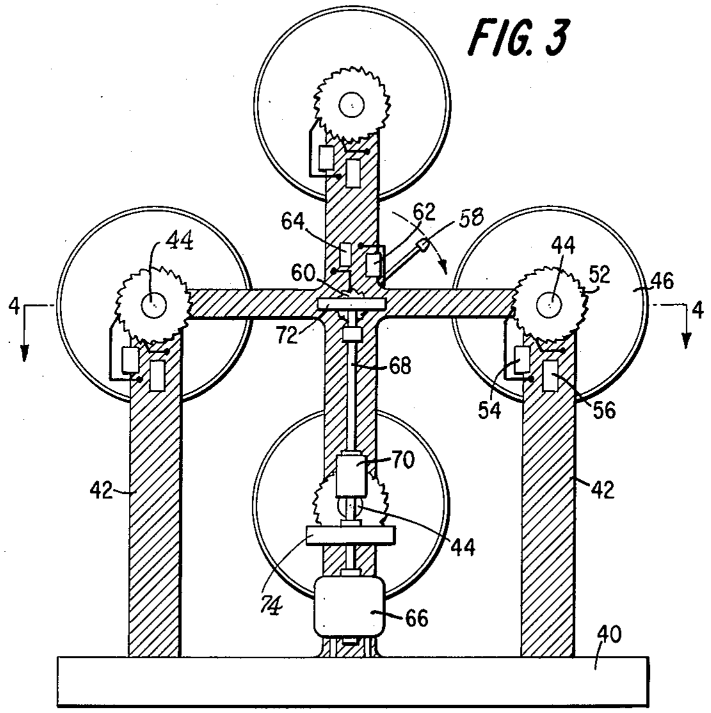
FIGURE 3 is a broken away end elevation of another embodiment of the present invention.
Figure 4:
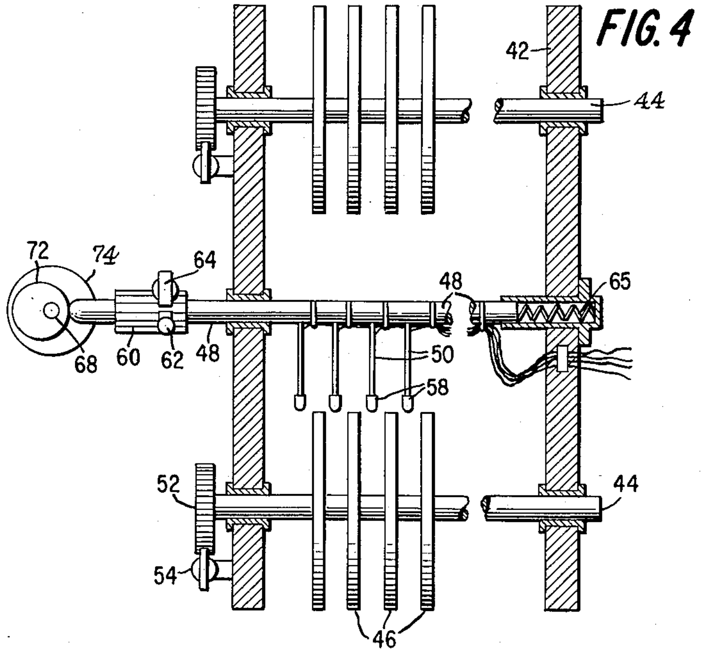
FIGURE 4 is a sectional view of the embodiment of FIGURE 3 taken along the line 4—4.

Generally, the embodiment of FIGS. 3 and 4 comprises a plurality of disks the peripheries of which are surfaced with a magnetic material. Associated with these disks are arms bearing at their outer ends heads for recording, reading and erasing information on the magnetic material. The rotational positions of the disks and the arms are remotely controlled.

As illustrated, this embodiment comprises a base 40 on which are mounted a plurality of upstanding supports 42. Journaled on supports 42 are four shafts 44, each carrying a bank of disks 46, and a shaft 48 carrying a bank of arms 50. Each shaft 44 also carries a ratchet 52 which is driven by a solenoid-controlled stepping pawl 54 and a solenoid-controlled releasing pawl 56. Each arm carries at its outer end a recording, reading and erasing head 58. A ratchet wheel 60 under the control of a solenoid controlled stepping pawl 62 and a solenoid controlled releasing pawl 64 indexes shaft 48. Heads 58 operate when moved across the peripheries of their associated disks. Such movement of heads 58 is effected by limited longitudinal movement of shaft 48 against the bias of a spring 65 under control of a motor 66 operating through a shaft 68, a magnetic clutch 70 and a cam 72. A flywheel 74 is designed to keep rotation of shaft 68 constant.

It will be noted that in operation head 58 sweeps across the periphery of its associated disk along a line paralleling the disk's axis. Access to a particular unit of information at a particular location on one of the disks is achieved by automatic controls (not shown) that select one of arms 50, the rotational position of shaft 48, one of disks 46 and the rotational position of the shaft 44 carrying that disk.

Since certain changes may be made in the above apparatus without departing from the scope of the invention herein involved, it is intended that all matter contained in the above description or shown in the accompanying drawing be interpreted in an illustrative and not in a limiting sense.

What is claimed is:

1. Information storing apparatus comprising a plurality of disks having areas surfaced with a material physically changeable in response to physical signals, transducing means for transmitting and receiving physical signals to and from said material, a plurality of shafts mounting said plurality of disks, mounting means for supporting said transducing means, said plurality of shafts being disposed in parallelism substantially at the surface of a hypothetical cylinder, said mounting means being disposed within said cylinder, first drive means for rotating said shafts into predetermined rotational position, second drive means for moving said transducing means with respect to said disks, and stop means for maintaining said predetermined positions of said shafts when said second drive means is operative.

2. The information storing apparatus of claim 1 wherein said first drive means includes means for stepping said shafts through successive discrete incremental angles.

3. The information storing apparatus of claim 1 wherein said material is magnetically susceptible.

4. The information storing apparatus of claim 1 wherein said areas are disposed at faces of said disks.

5. The information storing apparatus of claim 1 wherein said areas are disposed at edges of said disks.

6. Information storing apparatus comprising a plurality of rows of disks having areas surfaced with a magnetically susceptible material, successive groups of disks in different rows being disposed substantially in successive planes, a plurality of transducers for transmitting and receiving electromagnetic signals to and from said material, successive transducers being operatively associated with said successive groups of disks, a plurality of shafts mounting said rows of disks, mounting means for supporting said transducing means, said plurality of shafts being disposed in parallelism substantially at the surface of a hypothetical cylinder, said mounting means being disposed within said hypothetical cylinder, first drive means for rotating said shafts into predetermined rotational positions, second drive means for moving said transducing means with respect to said disks, and stop means for maintaining said predetermined poitions of said shafts when said second drive means is operative.

7. The information storing apparatus of claim 6 wherein said first drive means includes means for stepping said shafts through successive discrete incremental angles.

8. The information storing apparatus of claim 6 wherein one each of said transducers is constrained for motion through an arc substantially in a plane that is contiguous with the plane of one each of said successive groups of disks.

9. The information storing apparatus of claim 6 wherein one each of said transducers is constrained for motion through an arc substantially in a plane that is contiguous with the plane of one each of said successive groups of disks and in a rectilinear direction parallel to the axes of said shafts.

10. Information storing apparatus comprising a plurality of rows of disks having areas surfaced with a magnetically susceptible material successive groups of disks in different rows being disposed substantially in successive planes, a plurality of transducers for transmitting and receiving electromagnetic signals to and from said material, successive transducers being operatively associated with said successive groups of disks, a plurality of shafts mounting said rows of disks, mounting means for supporting said transducing means, said plurality of shafts being disposed in parallelism substantially at the surface of a hypothetical cylinder, said mounting means being disposed within said hypothetical cylinder, first drive means for rotating said shafts into predetermined rotational positions, second drive means for moving said transducing means with respect to said disks, and stop means for maintaining said predetermined positions of said shafts when said second drive means is operative, said first drive means including ratchets on said shafts, pawls operatively connected to said ratchets, and solenoids operatively connected to said pawls.

References Cited in the file of this patent

UNITED STATES PATENTS

| | | |
|---|---|---|
| 2,690,913 | Rabinow | Oct. 5, 1954 |
| 2,800,642 | May | July 23, 1957 |
| 2,852,761 | Hagopian | Sept. 16, 1958 |